J. W. Tanner,
Fife,
№ 43,438. Patented July 5, 1864.
FIG. II
FIG. I
Witnesses.
William Wray
Edward Osborne
Inventor.
John W. Tanner

UNITED STATES PATENT OFFICE.

JOHN W. TANNER, OF NEW YORK, N. Y.

IMPROVEMENT IN CONSTRUCTING FIFES.

Specification forming part of Letters Patent No. 43,438, dated July 5, 1864.

*To all whom it may concern:*

Be it known that I, JOHN W. TANNER, of the city, county, and State of New York, have invented a new and Improved Method of Making Fifes; and I do hereby declare the following to be a full, clear, and exact description of the same, reference being had to the accompanying drawings, figures, and letters of reference thereon, making part of this specification.

In the drawings, Figure 1 is a plain elevation of a C-fife. Fig. 2 is the finger part of a B-fife.

My invention consists in making a fife convertible for convenience of transportation for soldiers, as well as greatly reducing the cost of manufacture, whereby, with three pieces or joints, a B or C fife is at hand, as may be desired.

I construct my fifes from metal tubes of the proper size and length, enlarging the part A for the wind-hole by inserting thereon a larger tube, as shown in the drawings, and filling the space between the two with soft metal, the joint D for the finger-piece being made by inserting and soldering a piece of tube to the main part. The finger-holes are made by soldering to the tube pieces of the proper size at proper distances apart for a B or C fife, as desired. The holes are then drilled and finished.

In the drawings, Fig. 2 is the finger-piece of a B and Fig. 1 of a C fife.

I claim—

As an improved article of manufacture, a fife made convertible, substantially as described, and for the purposes set forth.

JOHN W. TANNER.

Witnesses:
 EDWARD OSBORNE,
 WILLIAM WRAY.